(12) United States Patent
Lee et al.

(10) Patent No.: US 9,246,761 B2
(45) Date of Patent: Jan. 26, 2016

(54) METHOD AND APPARATUS FOR CONTROLLING RESOURCE OF CLOUD VIRTUAL BASE STATION

(71) Applicant: Electronics and Telecommunications Research Institute, Daejeon-si (KR)

(72) Inventors: Chan Yong Lee, Daejeon-si (KR); Eun Seon Cho, Daejeon-si (KR); Hyeon Ju Oh, Daejeon-si (KR); Byung Han Ryu, Daejeon-si (KR); Nam Hoon Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 149 days.

(21) Appl. No.: 14/085,103

(22) Filed: Nov. 20, 2013

(65) Prior Publication Data
US 2015/0055483 A1 Feb. 26, 2015

(30) Foreign Application Priority Data

Aug. 21, 2013 (KR) .................. 10-2013-0098848

(51) Int. Cl.
| | |
|---|---|
| *H04L 12/24* | (2006.01) |
| *H04L 12/26* | (2006.01) |
| *G06F 9/50* | (2006.01) |
| *G06F 11/30* | (2006.01) |
| *G06F 11/07* | (2006.01) |

(52) U.S. Cl.
CPC .......... *H04L 41/0869* (2013.01); *G06F 9/5072* (2013.01); *H04L 41/0803* (2013.01); *H04L 43/50* (2013.01); *G06F 9/5038* (2013.01); *G06F 11/0709* (2013.01); *G06F 11/3006* (2013.01); *G06F 11/3051* (2013.01)

(58) Field of Classification Search
None
See application file for complete search history.

(56) References Cited

U.S. PATENT DOCUMENTS

| | | | | |
|---|---|---|---|---|
| 7,577,722 | B1* | 8/2009 | Khandekar et al. | 709/220 |
| 8,527,562 | B2* | 9/2013 | Ogasawara et al. | 707/823 |
| 8,661,120 | B2* | 2/2014 | Atchison et al. | 709/224 |
| 2003/0105810 | A1* | 6/2003 | McCrory et al. | 709/203 |
| 2008/0109343 | A1* | 5/2008 | Robinson et al. | 705/37 |
| 2008/0289034 | A1* | 11/2008 | Basibes et al. | 726/19 |
| 2009/0049156 | A1* | 2/2009 | Aronsson et al. | 709/219 |
| 2010/0046377 | A1* | 2/2010 | Ryan et al. | 370/241 |

(Continued)

FOREIGN PATENT DOCUMENTS

| | | |
|---|---|---|
| KR | 10-2011-0133409 | 12/2011 |
| KR | 10-2012-0070945 | 7/2012 |
| KR | 10-2012-0096741 | 8/2012 |

*Primary Examiner* — Bunjob Jaroenchonwanit
(74) *Attorney, Agent, or Firm* — Nelson Mullins Riley & Scarborough LLP

(57) ABSTRACT

A method and apparatus for managing a cloud virtual base station system are disclosed. The present invention comprises configuring an initial resource and reconfiguring the resource to add or remove a resource of an execution file of the cloud virtual base station system, monitoring an error of the cloud virtual base station system, a wireless resource, a status of the execution file, or a configuration status of the reconfigured resource, managing configuration information of a list of software added or removed during an operation, controlling the cloud virtual base station system in a predetermined specific mode, managing hardware information, file information, or control information of each module of the cloud virtual base station system, and managing the execution file for each module of the cloud virtual base station system by adding or removing the predetermined specific mode initially or during an operation.

15 Claims, 15 Drawing Sheets

(56) References Cited

U.S. PATENT DOCUMENTS

| | | | |
|---|---|---|---|
| 2012/0041921 A1* | 2/2012 | Canaday et al. | 707/607 |
| 2012/0060165 A1* | 3/2012 | Clarke | 718/104 |
| 2012/0072762 A1* | 3/2012 | Atchison et al. | 714/2 |
| 2012/0179802 A1* | 7/2012 | Narasimhan et al. | 709/223 |
| 2013/0066940 A1* | 3/2013 | Shao | 709/201 |
| 2013/0080619 A1* | 3/2013 | Assuncao et al. | 709/224 |
| 2013/0190026 A1* | 7/2013 | Agrawal et al. | 455/507 |
| 2013/0191840 A1* | 7/2013 | Barsness et al. | 718/104 |
| 2014/0047081 A1* | 2/2014 | Edwards | 709/220 |
| 2014/0156835 A1* | 6/2014 | Atchison et al. | 709/224 |
| 2014/0247792 A1* | 9/2014 | Wang | 370/329 |
| 2014/0258446 A1* | 9/2014 | Bursell | 709/217 |
| 2014/0297871 A1* | 10/2014 | Iikura et al. | 709/226 |
| 2014/0344810 A1* | 11/2014 | Wang | 718/1 |
| 2015/0012657 A1* | 1/2015 | Botti et al. | 709/226 |
| 2015/0095691 A1* | 4/2015 | Edwards | 714/4.11 |

* cited by examiner

METHOD AND APPARATUS FOR CONTROLLING RESOURCE OF CLOUD VIRTUAL BASE STATION

The instant application claims priority to Korean patent application number 10-2013-0098848 filed on Aug. 21, 2013, the entire disclosure of which is incorporated by reference herein.

BACKGROUND OF THE INVENTION

1. Technical Field

The present invention relates to a cloud virtual base station of a mobile communication system, and more specifically, to a method and apparatus for managing subscribers' services and multiple cells.

2. Discussion of Related Art

A mobile communication system need automatically configure, monitor and manage cloud virtual base station systems that manage multiple cells so as to save maintenance costs related to an operator's operation. To support this, there is a need to apply a method and apparatus for controlling cloud virtual base stations.

SUMMARY OF THE INVENTION

An object of the present invention is to provide internal components of a cloud virtual base station management system and a cloud virtual base station system.

Another object of the present invention is to provide a control method and apparatus in a cloud virtual base station system.

Still another object of the present invention is to provide a control method and apparatus in a cloud virtual base station management system.

Yet still another object of the present invention is to provide a method and apparatus for controlling a resource configuration of a cloud virtual base station.

According to an aspect of the present invention, a cloud virtual base station management system for managing a cloud virtual base station system comprises an initialization and loader that configures an initial resource and reconfigures the resource to add or remove a resource of an execution file of the cloud virtual base station system, a target status managing unit that monitors or manages an error of the cloud virtual base station system, a wireless resource, a status of the execution file, or a configuration status of the reconfigured resource, a configuration managing unit that is driven by the initialization and loader, wherein the configuration managing unit activates or inactivates a hardware shape for the cloud virtual base station system, blocks the hardware shape or releases the blocking, adds or removes a hardware shape, change a parameter, or manages configuration information of a list of software added or removed during an operation, and a file managing unit that is driven by the initialization and loader, wherein the file managing unit manages the execution file on a per-module basis in a specific mode that is added or removed initially or during an operation.

According to another aspect of the present invention, a method of managing a cloud virtual base station system by a cloud virtual base station management system comprises a target initializing step that configures an initial resource and reconfigures the resource to add or remove a resource of an execution file of the cloud virtual base station system, a status managing step that monitors or manages an error of the cloud virtual base station system, a wireless resource, a status of the execution file, or a configuration status of the reconfigured resource, a configuration managing step that activates or inactivates a hardware shape for the cloud virtual base station system, blocks the hardware shape or releases the blocking, adds or removes a hardware shape, change a parameter, or manages configuration information of a list of software added or removed during an operation, a mode controlling step that controls the cloud virtual base station system in a predetermined specific mode, an information managing step that manages hardware information, file information, or control information of each module of the cloud virtual base station system, and a file managing step that manages the execution file for each module of the cloud virtual base station system by adding or removing the predetermined specific mode initially or during an operation.

According to the present invention, costs for operation and maintenance of a cloud virtual base station may be saved.

According to the present invention, subscribers' services may be enhanced, and maintenance costs related to an operator's operation may be saved.

DESCRIPTION OF EMBODIMENTS

Hereinafter, embodiments of the present invention will be described in detail with reference to the accompanying drawings so that the present invention may be easily implemented by those skilled in the art. However, the present invention may be realized in other various forms and is not limited to the embodiments disclosed herein. Further, what is considered to be irrelevant to the present invention has been omitted to clearly disclose the present invention, and the same or similar denotations are used to refer to the same or similar elements throughout the drawings.

The objects and effects of the present invention may be more clearly understood by the following detailed description of the present invention. Further, when determined to make the subject matter unnecessarily unclear, the detailed description of the prior art will be skipped. Hereinafter, embodiments of the present invention are described with reference to the accompanying drawings.

According to the present invention, in a mobile communication system, when multiple cells are dynamically operated in a specific mode, the software is reconfigured in a cloud virtual base station system by setting specific cells to a specific mode, so that subscribes' services are enhanced, and maintenance costs related to an operator's operation may be saved.

In other words, a method and apparatus for controlling cloud virtual base stations that efficiently manage subscribers' services and collectively manage multiple cells in each specific mode in a mobile communication system are described in detail with reference to the accompanying drawings.

According to the present invention, a cloud virtual base station that is in charge of a cell is further divided into one or more cloud virtual base station systems and one or more cloud virtual base station management systems.

Figure 1:
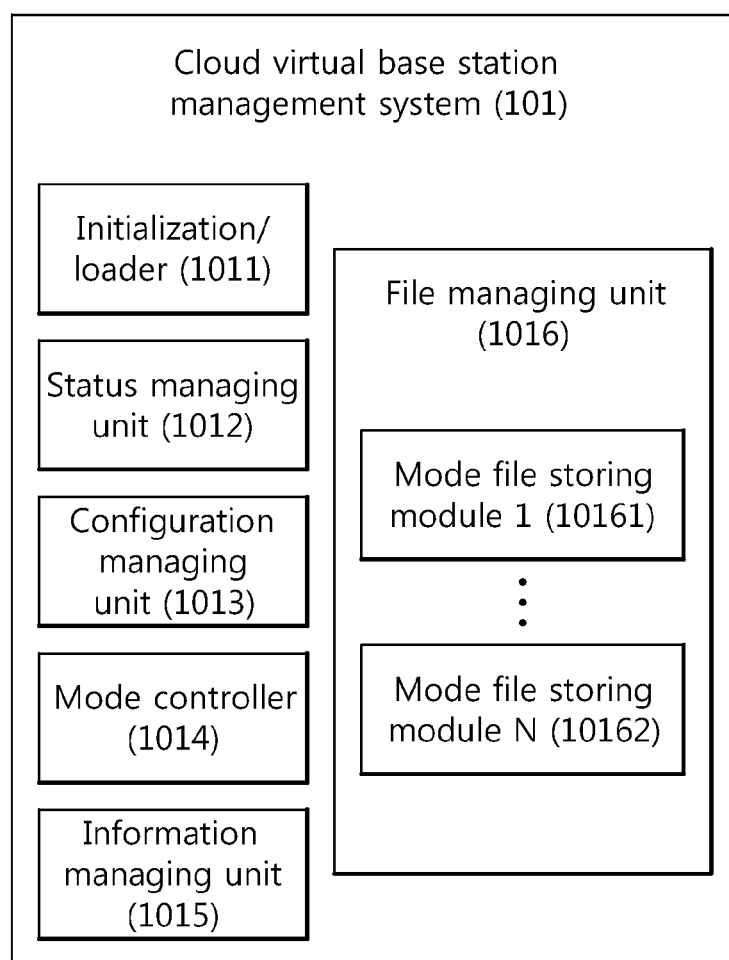
FIG. 1 illustrates an example of a cloud virtual base station management system according to the present invention.

FIG. 1 illustrates an example of a cloud virtual base station management system according to the present invention.

Referring to FIG. 1, the cloud virtual base station management system 101 includes an initialization/loader 1011, a status managing unit 1012, a configuration managing unit 1013, a mode controller 1014, an information managing unit 1015, or a file managing unit 1016.

The initialization/loader 1011 is automatically or manually driven to set up an initial resource.

The initialization/loader 1011 drives necessary files. For example, the initialization/loader 1011 drives files required by the status managing unit 1012, configuration managing unit 1013, the mode controller 1014, the information managing unit 1015, and the file managing unit 1016.

The initialization/loader 1011 downloads files (e.g., execution files and environment files) for each of one or more cloud virtual base station systems.

The initialization/loader 1011 may download the files for each system while interworking with a target initial/loader of one or more cloud virtual base station systems.

The initialization/loader 1011 downloads the files based on an initial resource or a reconfiguration added or removed during operation.

The status managing unit 1012 is driven by the initialization/loader 1011.

The status managing unit 1012 monitors or manages errors and wireless resources of the cloud virtual base station system or monitors and manages driven files while interworking with the target status managing unit of one or more cloud virtual base station systems.

The status managing unit 1012 monitors or manages a resource configuration status that is added or removed during operation.

The configuration managing unit 1013 is driven by the initialization/loader 1011.

The configuration managing unit 1013 manages configuration information or operation information for one or more cloud virtual base station systems.

By way of example, the configuration managing unit 1013 activates or inactivates hardware shape, blocks or release the blocking, adds or removes a hardware shape, and changes parameters for one or more cloud virtual base station systems.

The configuration managing unit 1013 manages configuration information or operation information such as a list of software that is added or removed during operation.

The mode controller 1014 is driven by the initialization/loader 1011.

The mode controller 1014 controls one or more cloud virtual base station systems in a specific mode.

The information managing unit 1015 is driven by the initialization/loader 1011.

The information managing unit 1015 manages cloud virtual base station system hardware information, file information, or control information of each unit (e.g., the initialization/loader 1011, the status managing unit 1012, the configuration managing unit 1013, or the mode controller 1014).

The file managing unit 1016 is driven by the initialization/loader 1011.

The file managing unit 1016 manages, on a per-module basis (or on a per-unit basis), files (e.g., execution files or environment files) of one or more cloud virtual base station systems that operate in a specific mode. At this time, the specific mode is an initial mode or may be a mode that is added or removed during operation.

Figure 2:
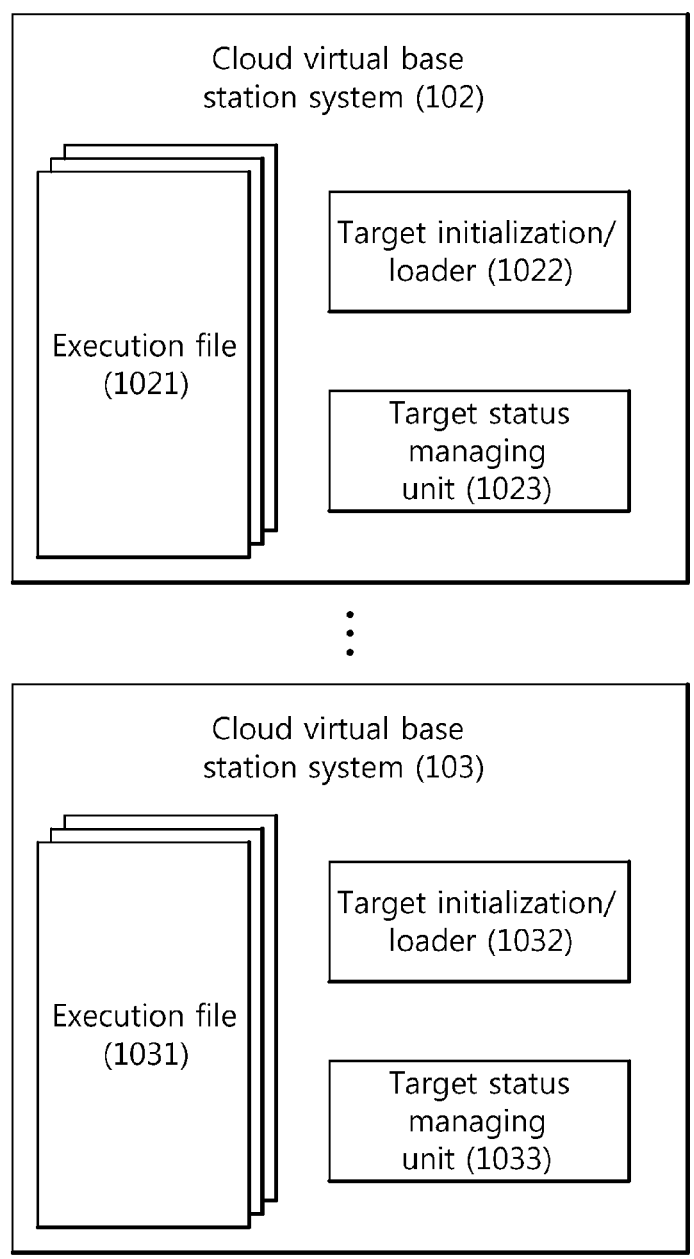
FIG. 2 illustrates an example of a cloud virtual base station system that controls cloud virtual base stations according to the present invention.

FIG. 2 illustrates an example of a cloud virtual base station system that controls cloud virtual base stations according to the present invention. One or more cloud virtual base station systems may be operated at the same time.

Referring to FIG. 2, the cloud virtual base station system 102 includes one or more execution files 1021, a target initialization/loader 1022, and a target status managing unit 1023.

Another cloud virtual base station system 103 includes one or more execution files 1031, a target initialization/loader 1032, and a target status managing unit 1033.

The execution files 1021 and 1031 are driven and operated in multiple hardware platforms so as to provide a mobile communication service. The execution files 1021 and 1031 may include environment files.

The target initialization/loaders 1022 and 1032 are automatically or manually driven for each cloud virtual base station system, set initial resources, and drive or download necessary files (e.g., status managing unit or execution file).

At this time, the target initialization/loaders 1023 and 1033 may drive or download the files based on an initial resource or a resource reconfiguration that is added or removed during operation.

The target status managing units 1023 and 1033 are driven by the target initialization/loaders 1022 and 1032.

The target status managing units 1023 and 1033 monitor or manage errors of the cloud virtual base station system, wireless resources, or driven files.

At this time, the target status managing units 1023 and 1033 may monitor or manage a configuration status that is added or removed.

FIGS. 3 to 7 illustrate examples of internal components of a cloud virtual base station management system or a cloud virtual base station system that controls cloud virtual base stations. This is about controlling the resource configuration of cloud virtual base stations.

Figure 3:
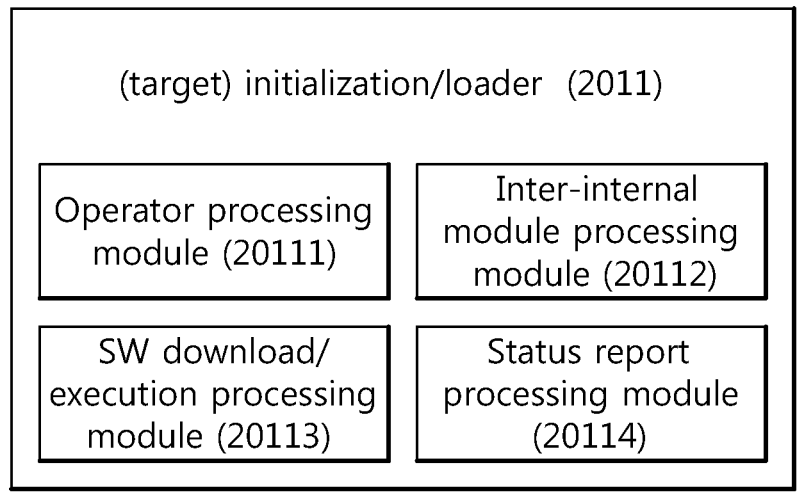
FIGS. 3 to 7 illustrate examples of internal components of a cloud virtual base station management system or a cloud virtual base station system that controls cloud virtual base stations. This is about controlling the resource configuration of cloud virtual base stations.

FIG. 3 illustrates an example of a target initialization/loader that controls cloud virtual base stations according to the present invention.

Referring to FIG. 3, the initialization/loader 2011 may be a target initialization/loader of a cloud virtual base station system or an initialization/loader of a cloud virtual base station management system.

The initialization/loader 2011 includes an operator processing module 20111, an inter-internal module processing module 20112, an SW download/execution processing module 20113, or a status report processing module 20114.

The operator processing module 20111 performs functions necessary to download passive files (e.g., execution files or environment files) that are added or removed during operation or initial files or are initialized through an operator.

The inter-internal module processing module 20112 performs some treatment while interworking with a related unit (target initialization/loader, configuration managing unit, mode controller, status managing unit, information managing unit, file managing unit). By doing so, the inter-internal module processing module 20112 performs a process necessary to download passive specific mode-related files (e.g., execution files or environment files) that are added or removed during operation or initialization.

The SW download/execution processing module 20113 downloads or executes passive or automatic necessary files (e.g., execution files or environment files) that are added or removed during operation or initiation to each physical position of the cloud virtual base station system while interworking with the target initialization/loader.

The status report processing module 20114 manages the status reported by the driven file (e.g., configuration managing unit, mode controller, status managing unit, information managing unit, file managing unit) in the cloud virtual base station management system. Further, the status report processing module 20114 manages errors and wireless resource status of the cloud virtual base station system.

Figure 4:
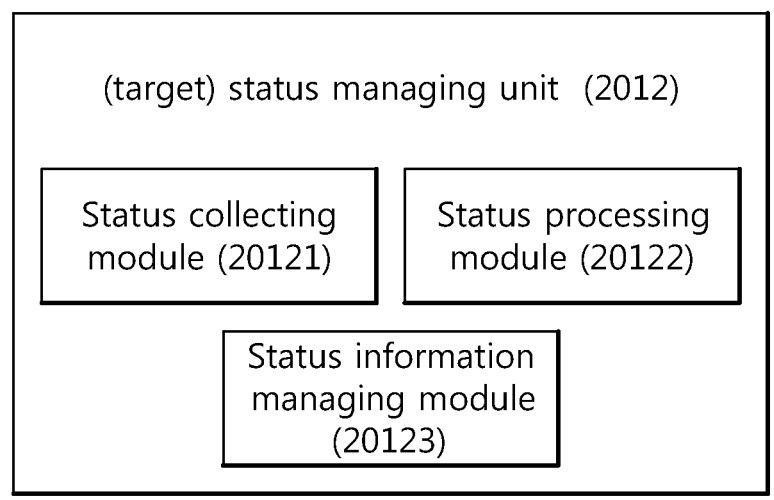

FIG. 4 illustrates an example of a status managing unit that controls cloud virtual base stations according to the present invention.

Referring to FIG. 4, the status managing unit 2012 may be a target status managing unit of the cloud virtual base station system or the status managing unit of the cloud virtual base station management system.

The status managing unit 2012 includes a status collecting module 20121, a status processing module 20122 or a status information managing module 20123.

The status collecting module 20121 collects driven files and hardware status, errors and wireless resource status. For example, the wireless resource status may include a traffic distribution, wireless channel or hardware load status.

The status processing module 20122 performs a proper process while a driven file and hardware status, error and wireless resource status occurs. As an example, the proper process may be an operation for restoring errors or adding or removing resources.

The status information managing module 20123 stores related information (e.g., status information) while a driven file and hardware status, error and wireless resource status occurs. The status information may include a status after an error restoring operation or resource adding or removing is performed.

Figure 5:
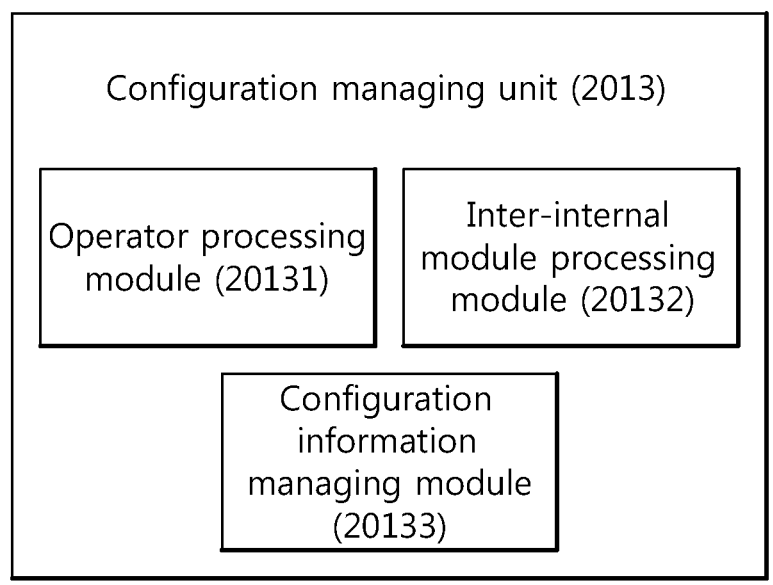

FIG. 5 illustrates an example of a configuration managing unit that controls cloud virtual base stations according to the present invention.

Referring to FIG. 5, the configuration managing unit 2013 includes an operator processing module 20131, an inter-internal module processing module 20132, or a configuration information managing module 20133.

The operator processing module 20131 processes configuration information or operation information for the cloud virtual base station system through an operator.

For example, the operator processing module 20131 activates or inactivates a hardware shape, blocks or releases the blocking, adds or removes a hardware shape, changes parameters for the cloud virtual base station system through an operator, and processes configuration information or operation information that configures a list of software that is added or removed during operation.

The inter-internal module processing module 20132 performs an interworking process between related units (e.g., initialization/loader, mode controller, status managing unit, information managing unit, file managing unit) for the operation of the operator processing module 20131.

The configuration information managing module 20133 manages the configuration information or operation information for the cloud virtual base station system through an operator.

For example, the configuration information managing module 20133 manages configuration information or operation information that activates or inactivates a hardware shape, blocks or releases the blocking, adds or removes a hardware shape, and changes parameters for the cloud virtual base station system through an operator.

Figure 6:
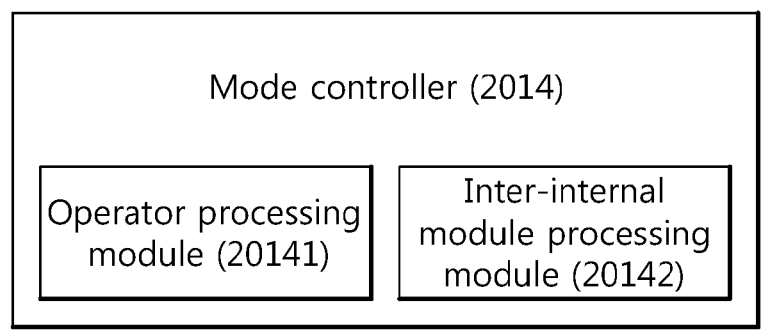

FIG. 6 illustrates an example of a mode controller that controls cloud virtual base stations according to the present invention.

Referring to FIG. 6, the mode controller 2014 includes an operator processing module 20141 or an inter-internal module processing module 20142.

The operator processing module 20141 configures and processes files (e.g., software) related to a specific mode of the cloud virtual base station system.

The inter-internal module processing module 20142 performs an interworking process between related units (e.g., initialization/loader, configuration managing unit, status managing unit, information managing unit, file managing unit) for a processing operation of the operator processing module.

Figure 7:
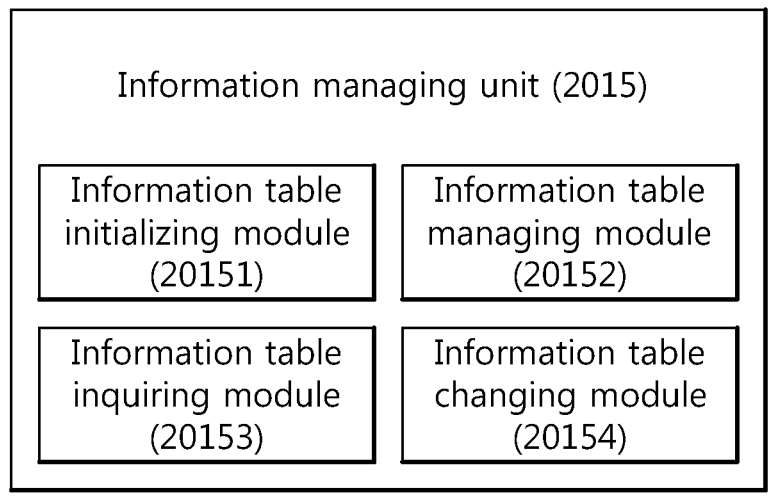
Figure 8A:
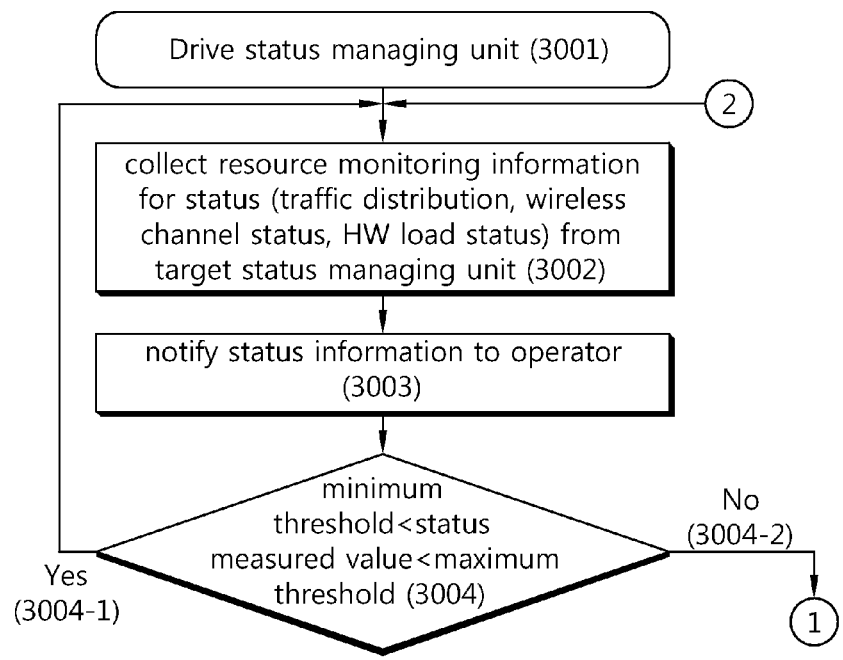
FIGS. 8 to 12 are flowcharts illustrating an example of a cloud virtual base station resource configuration control process according to the present invention.
Figure 8B:
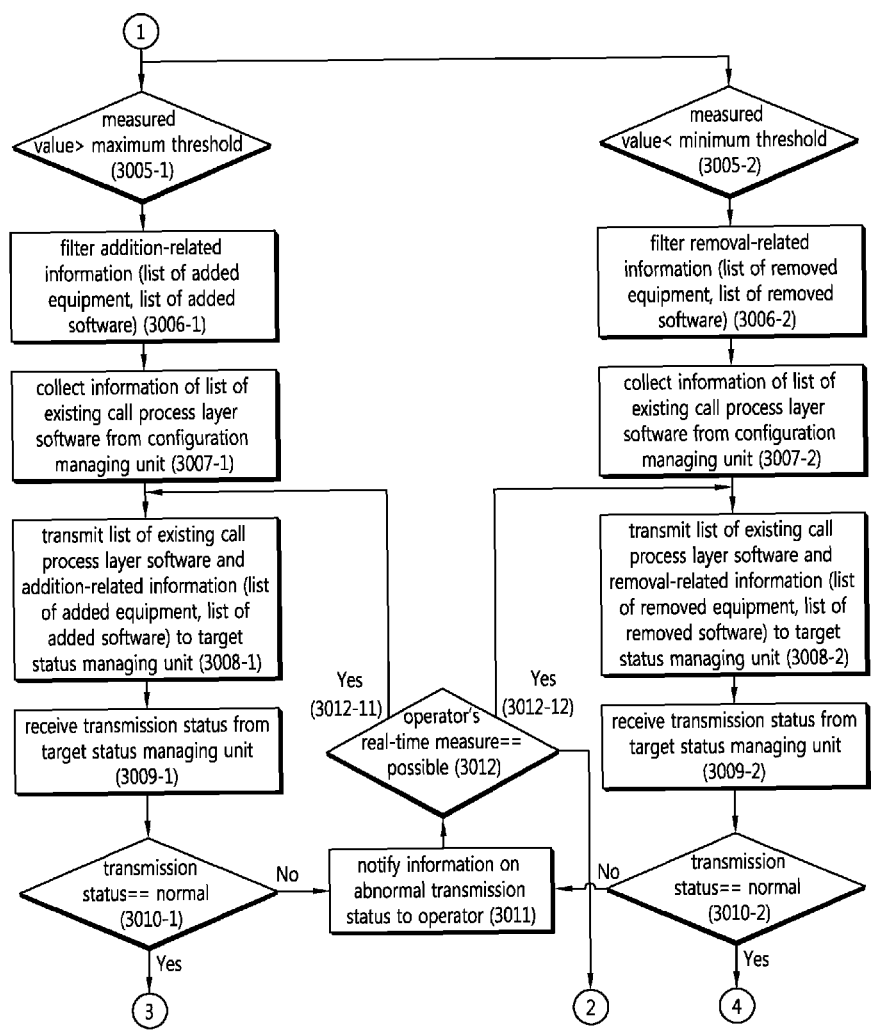
Figure 8C:
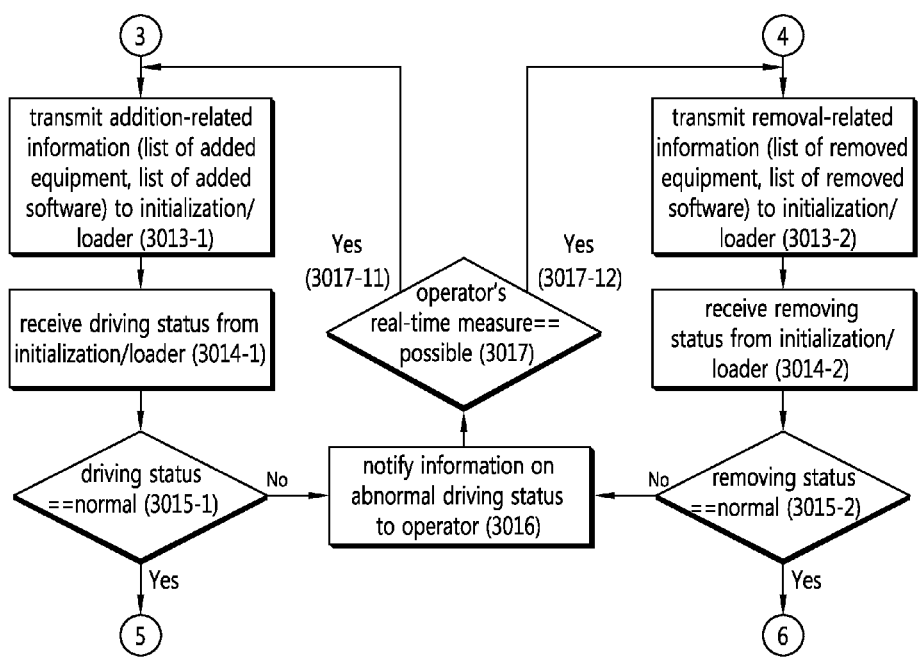
Figure 8D:
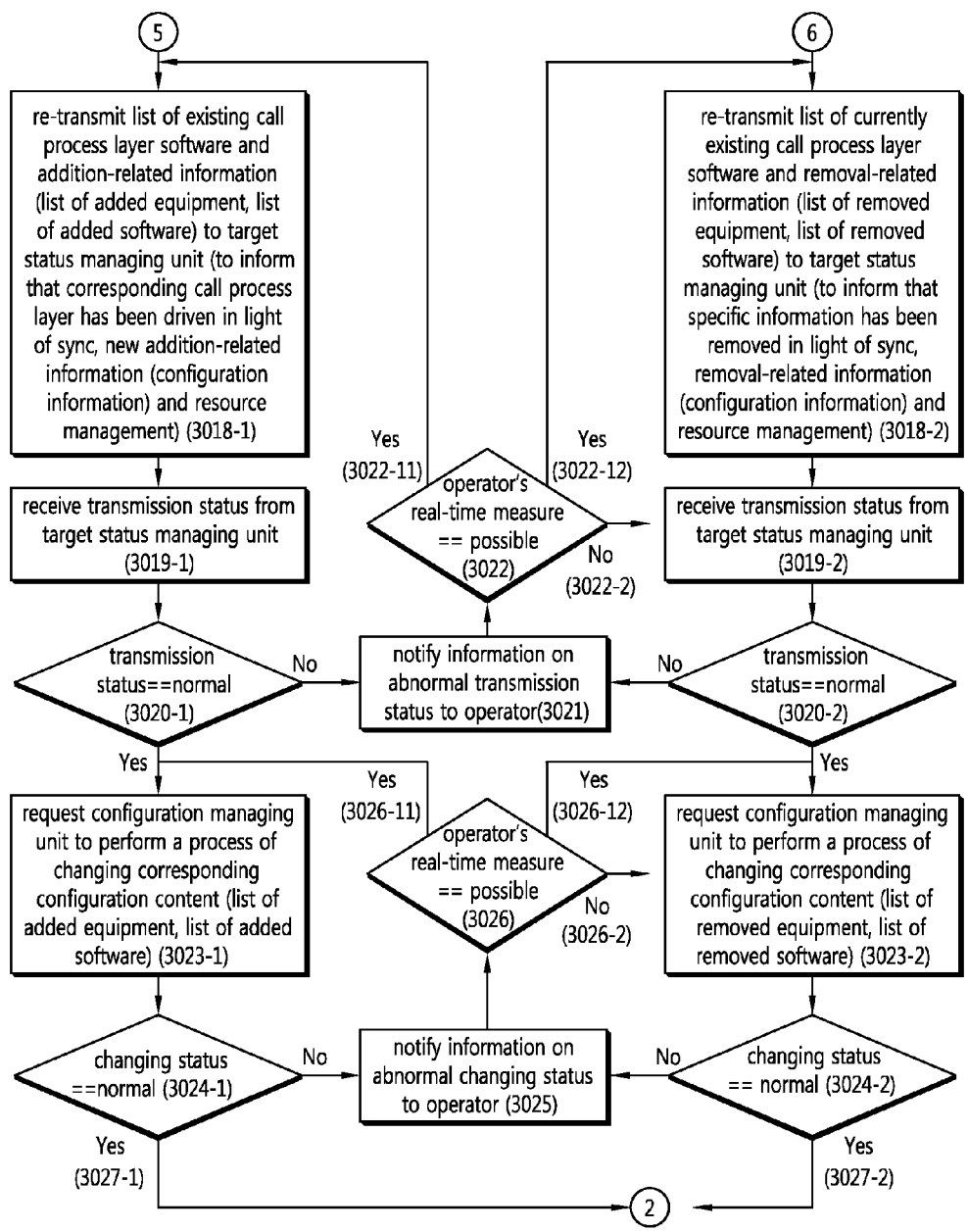

FIG. 7 illustrates an example of an information managing unit that controls cloud virtual base stations according to the present invention.

Referring to FIG. 7, the information managing unit 2015 includes an information table initializing module 20151, an information table managing module 20152, an information table inquiring module 20153, or an information table changing module 20154.

The information table initializing module 20151 configures an initial data table for a related unit (e.g., initialization/loader, configuration managing unit, status managing unit, mode controller).

The information table managing module 20152 generates or deletes a data table.

The information table inquiring module 20153 inquires information of the data table.

The information table changing module 20154 changes the information of the data table.

FIGS. 8 to 12 are flowcharts illustrating an example of a cloud virtual base station resource configuration control process according to the present invention.

FIG. 8 illustrates an example of an operation of a status managing unit of a cloud virtual base station management system according to the present invention.

Referring to FIG. 8, the status managing unit is driven (3001).

Subsequently, monitoring a resource status (e.g., traffic distribution, wireless channel status, hardware load status, etc.) of a target from the target status managing unit is performed, and resource status information is collected (3002).

Then, the collected resource status information is stored and is notified to an operator (3003).

Next, it is determined whether the collected resource status information (e.g., traffic distribution, wireless channel or hardware load) exceeds a predetermined maximum threshold that intends to be managed, is less than a predetermined minimum threshold, or is between the predetermined minimum threshold and the predetermined maximum threshold.

In step 3003, in case a measured value or an average (hereinafter, referred to as "accumulated average measured value) of accumulated values for the resource status information (e.g., traffic distribution, wireless channel or hardware load level) is between the predetermined minimum threshold and the predetermined maximum threshold, the status managing unit normally stands by without reconfiguring the resources during operation (or shifts to a stand-by status) (3004-1).

In step 3003, in case the measured value or accumulated average measured value of the resource status information (e.g., traffic distribution, wireless channel or hardware load level) is less than the predetermined minimum threshold or in excess of the predetermined maximum threshold, the process goes to the step of configuring or reconfiguring resources during operation (3004-2).

In step 3004-2, the measured value or accumulated average measured value of the resource status information exceeds the predetermined maximum threshold and the process goes to the step of configuring or reconfiguring resources during operation (3005-1).

In step 3005-1, it exceeds the predetermined maximum threshold, so that a list of addition-related information (e.g., a list of added hardware and a list of software per added hardware) for adding hardware and software resources of the cloud virtual base station systems that are currently in operation is filtered and detected (3006-1).

Subsequently, hardware information of a virtual base station system that is currently in operation and lists of software resource of call process-related layers of each hardware are collected from the configuration managing unit that manages the hardware of all the virtual base station systems and information on the lists of software information of each hardware (3007-1).

Next, the hardware information of the virtual base station system currently in operation and software resource lists of the call process-related layers of each hardware and the filtered and detected list of addition-related information (e.g., a list of added hardware and a list of software per added hardware) are transmitted to a specific hardware (3008-1). At this time, the corresponding list of software may be transmitted to one or more target status managing units that are present in the specific hardware.

Then, whether the list of software is in the status of transmission from one or more target status managing units is received (3009-1).

Subsequently, whether the transmission status of the list of software received from one or more target status managing units is normal is determined (3010-1).

Thereafter, if the transmission status of the list of software received from one or more target status managing units is abnormal, this is notified to an operator or a system that is managed by an operator (3011).

Then, whether a real-time measure by the operator or the system that is managed by an operator is possible is determined (3012).

In case in step 3012 the real-time measure is possible, step 3008-1 is performed so that corresponding one or more target status managing units resend the corresponding list of software (3012-11).

In case in step 3012 the real-time measure is impossible, it is notified so that it is addressed by the operator or the system managed by an operator with a notified cause, and step 3002 is conducted (3012-2).

If in step 3010-1 the transmission status of the list of software received from one or more target status managing units being currently operated is normal, a list of addition-related information (e.g., a list of added hardware and a list of software per added hardware) is transmitted to the initialization/loader (3013-1).

Subsequently, status information on whether software execution files (e.g., image files) of call process-related layers corresponding to the list of software per added hardware are downloaded to the corresponding hardware and are driven is received from the initialization/loader (3014-1).

Thereafter, it is determined whether the driving status of the software execution files (e.g., image files) of the call process-related layers corresponding to the list of software per added hardware is normal (3015-1).

If in step 3015-1, the driving status of the software execution files (e.g., image files) added from the initialization/loader are abnormal, this is notified to the operator or the system managed by an operator (3016).

Subsequently, whether a real-time measure may be taken by the operator or the system managed by an operator is determined (3017).

In case in step 3017, the real-time measure is possible, step 3013-1 is performed to drive the software execution files (e.g., image files) corresponding to one or more initialization/loaders (3017-11).

In case in step 3017 the real-time measure is impossible, it is notified so that it may be addressed by the operator or the system managed by an operator with the notified cause and step 3002 is conducted (3017-2).

If in step 3015-1 the driving status of the software execution files (e.g., image files) added from the initialization/loaders is normal, the information (e.g., a list of existing hardware, information on the list of software for each hardware, list of added hardware, and information on the list of software for each hardware) that the list of software added to the added target status managing units or existing target status managing units has been normally driven is transmitted (3018-1). This is for informing resource management process-related information or sync problem that is caused due to addition of resources while operating one or more existing call process layer software and one or more added call process layer software.

Subsequently, whether transmission is performed from the existing or added target status managing units is received (3019-1).

Then, whether the transmission status of the existing or added target status managing units is normal is determined (3020-1).

Thereafter, if the transmission status of the existing or added target status managing units is abnormal, this is notified to the operator or the system managed by an operator (3021).

Subsequently, whether a real-time measure may be taken by the operator or the system managed by an operator is determined (3022).

In case in step 3022, the real-time measure is possible, step 3018-1 is performed to transmit information (e.g., list of the existing or added hardware and information on the list of software for each hardware) that the list of added software to the existing or added target status managing units has been normally driven (3022-11).

In case in step 3022 the real-time measure is impossible, it is notified so that it may be addressed by the operator or the system managed by an operator with the notified cause, and step 3002 is performed (3022-2).

If in step 3020-1 the transmission status of all the target status managing units is normal, a request for a changing process for adding (e.g., adding a list of hardware or adding a list of software for each of added hardware) hardware and software resources of the corresponding cloud virtual base station system is sent to the configuration managing unit (3023-1).

Subsequently, a changing process status is received from the configuration managing unit, and whether the changing process status is normal is determined (3024-1).

Then, if the changing process status received from the configuration managing unit is abnormal, this is notified to the operator or the system managed by an operator (3025).

Thereafter, whether a real-time measure may be taken by the operator or the system managed by an operator is determined (3026).

In case in step 3026 the real-time measure is possible, step 3023-1 is performed to conduct the changing process for adding (e.g., adding a list of hardware and adding a list of software for each of added hardware) to the configuration managing unit (3026-11).

In case in step 3026 the real-time measure is impossible, this is notified so that it may be addressed by the operator or the system managed by an operator with the notified cause, and step 3002 is performed (3026-2).

If in step 3024-1 the changing process status received from the configuration managing unit is normal, step 3002 is performed (3027-1).

Meanwhile, in step 3004-2, the measured value of the resource status information or average of the accumulated measured values is not more than the minimum threshold, so that shifting to the step of configuring or reconfiguring resources during operation is performed (3005-2)

In step 3005-2, it is less than the predetermined minimum threshold, so that a removal-related information list (e.g., list of removed hardware and list of software for each of the removed hardware) is filtered and detected for removing the hardware and software resources of the cloud virtual base station systems currently being operated (3006-2).

Subsequently, hardware information of the virtual base station system currently in operation and software resource lists of call process-related layers of each hardware are collected from the configuration managing unit that manages the software list information of each hardware and hardware for all the virtual base station systems (3007-2).

Then, the software resource lists of the call process-related layers of each hardware and hardware information of the virtual base station system being currently operated and the filtered and detected removal-related information list (e.g., list of removed hardware and list of software for each of the removed hardware) are transmitted to a specific hardware (3008-2). At this time, the corresponding software may be transmitted to one or more target status managing units that are present in the specific hardware.

Thereafter, information about whether the list of software is transmitted from one or more target status managing units is received (3009-2).

Subsequently, whether the transmission status of the list of software from one or more target status managing units is normal is determined (3010-2).

Then, if the transmission status of the list of software received from one or more target status managing units is abnormal, this is notified to the operator or the system managed by an operator (3011).

Thereafter, whether a real-time measure may be taken by the operator or the system managed by an operator is determined (3012).

In case in step 3012, the real-time measure is possible, step 3008-2 is performed to resend the corresponding list of software to corresponding one or more target status managing units (3012-12).

In case in step 3012, the real-time measure is impossible, this is notified so that it may be addressed by the operator or the system managed by an operator with the notified cause, and step 3002 is performed (3012-2).

If in step 3012-2, the transmission status of the list of software received from one or more target status managing units being currently operated is normal, the removal-related information list (e.g., list of removed hardware and list of software for each of the removed hardware) is transmitted to the initialization/loader (3013-2).

Subsequently, the status information regarding whether the software execution files (e.g., image files) of the call process-related layers corresponding to the list of software for each of the removed hardware has been removed from the corresponding hardware is received from the initialization/loader (3014-2).

Then, whether the removing status of the software execution files (e.g., image files) of the call process-related layers corresponding to the list of software for each of the removed hardware is normal is determined (3015-2).

If in step 3015-2, the removing status of the removed software execution files (e.g., image files) is abnormal, this is notified to the operator or the system managed by an operator (3016).

Subsequently, whether a real-time measure may be taken by the operator or the system managed by an operator is determined (3017).

In case in step 3017, the real-time measure is possible, step 3013-1 is performed to remove the software execution files (e.g., image files) corresponding to one or more initialization/loaders (3017-12).

In case in step 3017, the real-time measure is impossible, this is notified so that it may be addressed by the operator or the system managed by an operator with the notified cause, and step 3002 is performed (3017-2).

If in step 3015-2, the removing status of the software execution files (e.g., image files) removed from the initialization/loaders is normal, the information (e.g., list of existing hardware and information on the list of software for each hardware, list of removed hardware and information on the list of software for each hardware) that the removed software list has been normally driven is transmitted to the existing target status managing units or removed target status managing units (3018-2). This is to inform resource management process-related information or sync problems that are caused due to removal of resources while one or more removed call process layer software and existing one or more call process layer software are operated.

Subsequently, the information about whether the transmission from the existing or removed target status managing units is underway is received (3019-2).

Then, whether the transmission status of the existing or removed target status managing units is normal is determined (3020-2).

Subsequently, if the transmission status of the existing or removed target status managing units is abnormal, this is notified to the operator or the system managed by an operator (3021).

Thereafter, whether a real-time measure may be taken by the operator or the system managed by an operator is determined (3022).

In case in step 3022 the real-time measure is possible, step 3018-1 is performed to transmit the information (e.g., list of existing or removed hardware and information on the list of software for each hardware) that the list of the removed software has been normally removed to the existing or removed target status managing units (3022-12).

In case in step 3022, the real-time measure is impossible, this is notified so that it may be addressed by the operator or the system managed by an operator with the notified cause, and step 3002 is performed (3022-2).

If in step 3020-1 the transmission status of all the target status managing units is normal, a request for a changing process for removing (e.g., removing the list of hardware or removing the list of software for each of the removed hardware) the hardware and software resources of the corresponding cloud virtual base station system is sent to the configuration managing unit (3023-2).

Subsequently, a changing process status is received from the configuration managing unit, and whether the changing process status is normal is determined (3024-2).

Then, if the changing process status received from the configuration managing unit is abnormal, this is notified to the operator or the system managed by an operator (3025).

Then, whether a real-time measure may be taken by the operator or the system managed by an operator is determined (3026).

In case in step 3026 the real-time measure is possible, step 3023-1 is performed to conduct a changing process for performing removal (e.g., removing the list of hardware and removing the list of software for each of the removed hardware) in the configuration managing unit (3026-12).

In case in step 3026 the real-time measure is impossible, this is notified so that it may be addressed by the operator or the system managed by an operator with the notified cause, and step 3002 is performed (3026-2).

If in step 3024-1 the changing process status received from the configuration managing unit is normal, step 3002 is performed (3027-2).

Figure 9:
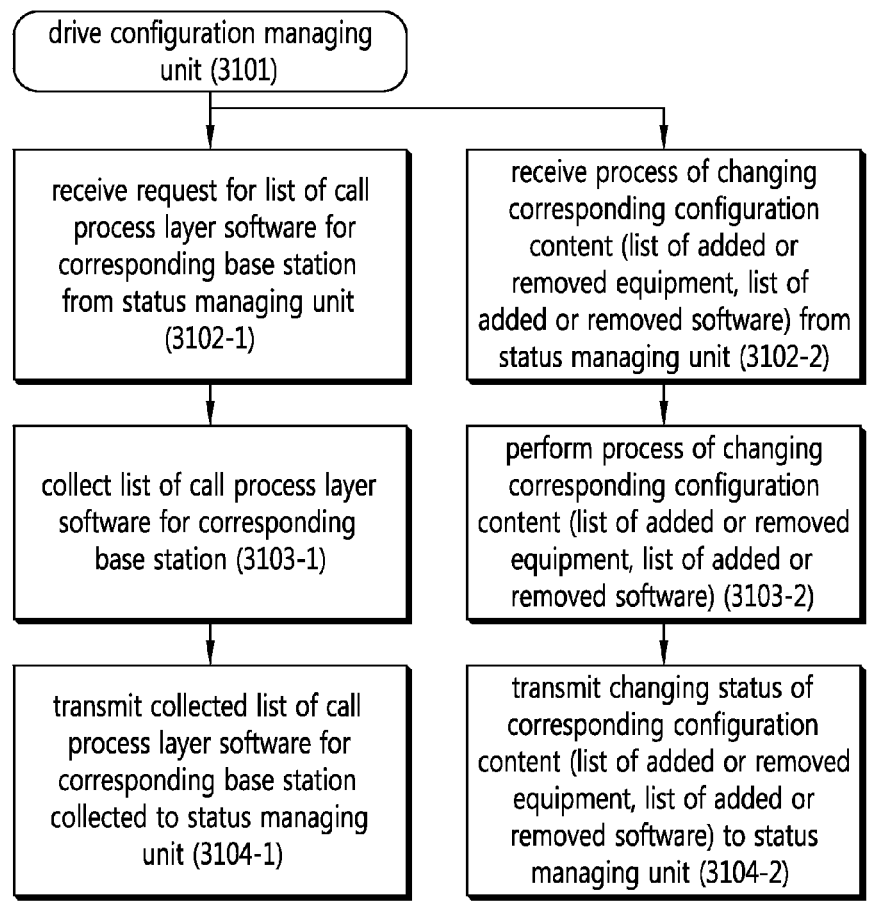

FIG. 9 illustrates an example of an operation of a configuration managing unit of a cloud virtual base station management system according to the present invention.

Referring to FIG. 9, the configuration managing unit is driven (3101).

By way of example, a request for hardware information of a virtual base station system being currently operated and software resource list information of call process-related layers of each hardware is received from the status managing unit (3102-1). For example, the request may be transmitted from the status managing unit in case a measured value or an average of accumulated measured values is in excess of a predetermined maximum threshold or less than a predetermined minimum threshold.

Subsequently, the hardware information of the virtual base station system being currently operated and software resource list of call process-related layers of each hardware are collected (3103-1).

Then, the collected hardware information of the virtual base station system and software resource list of call process-related layers of each hardware are transmitted to the status managing unit (3104-1).

As another example, in step 3101, a request for a changing process for adding hardware or software resources of the corresponding cloud virtual base station system (e.g., adding a list of hardware and adding a list of software for each of added hardware) is received from the status managing unit (3102-2).

Or, in step 3101, a request for a changing process for removing hardware or software resources of the corresponding cloud virtual base station system (e.g., removing a list of hardware and removing a list of software for each of the removed hardware) is received from the status managing unit (3102-2).

In step 3102-2, upon a request for adding hardware or software resources of the corresponding cloud virtual base station system, a changing process for such adding (e.g., adding a list of hardware and adding a list of software for each of added hardware) is performed (3103-2).

Or, in step 3102-2, upon a request for removing hardware or software resources of the corresponding cloud virtual base station system, a changing process for such removing (e.g., removing a list of hardware and removing a list of software for each of the removed hardware) is received from the status managing unit is performed (3103-2).

In step 3103-2, the changing process status of the adding is transmitted to the status managing unit (3104-2).

Or, in step 3103-2, the changing process status of the removing is transmitted to the status managing unit.

Figure 10:
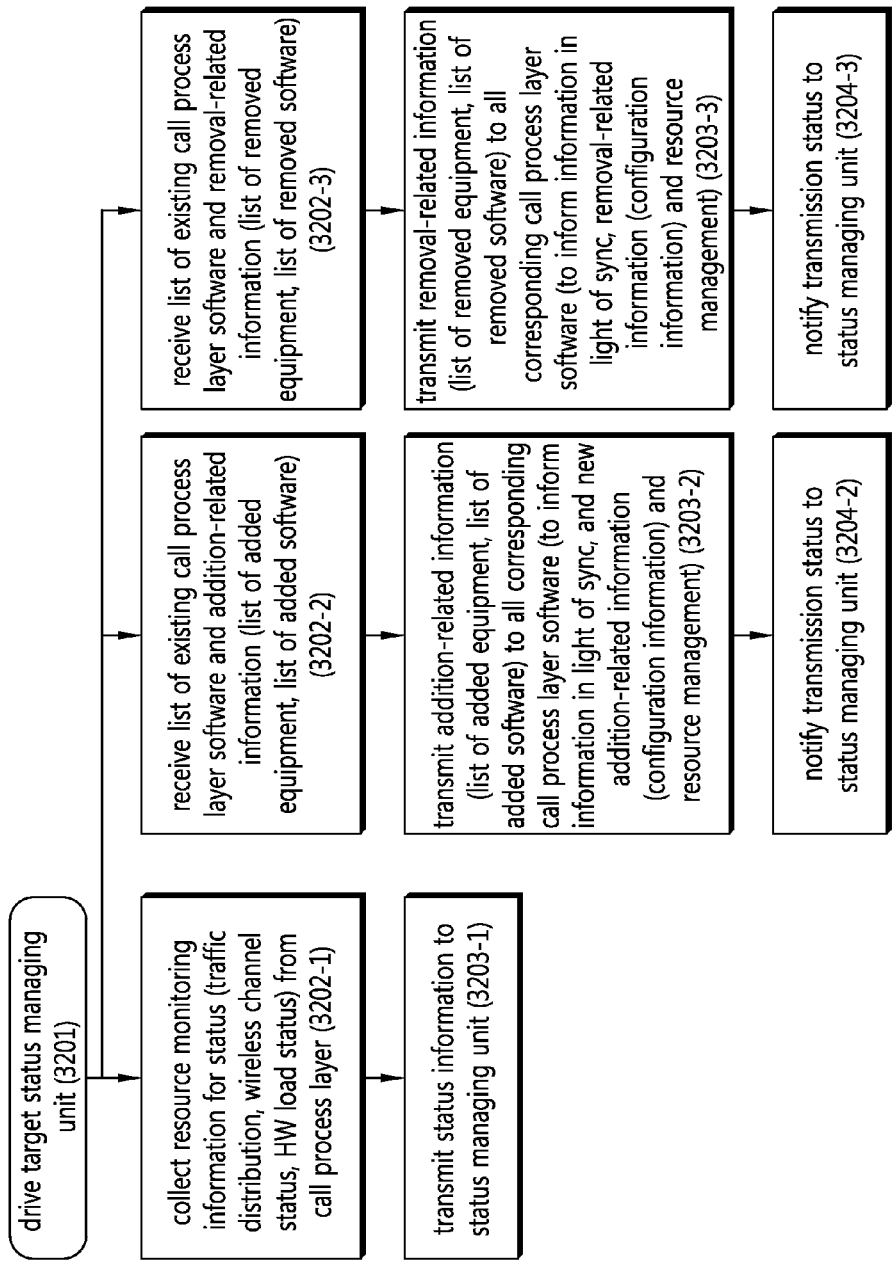

FIG. 10 illustrates an example of an operation of a target status managing unit of a cloud virtual base station management system according to the present invention.

Referring to FIG. 10, the target status managing unit is driven (3201).

By way of example, in step 3201, resource monitoring information for a status (e.g., traffic distribution, wireless channel status, HW load status) is collected from a call process layer (3202-1).

Subsequently, the corresponding status information is transmitted to the status managing unit (3203-1). Then, step 3002 may be performed.

As another example, in step 3201, an existing call process layer software list and addition-related information (e.g., list of added equipment, list of added hardware) are received (3202-2).

Subsequently, the addition-related information (e.g., list of added equipment, list of added software) is transmitted to all of the corresponding call process layer software (3203-2).

Subsequently, the transmission status is notified to the status managing unit (3204-2). Then, step 3009-1 may be performed.

As another example, in step 3201, the existing call process layer software list and removal-related information (e.g., list of removed equipment and list of removed software) is received (3202-3).

Subsequently, the removal-related information (e.g., list of removed equipment and list of software) is transmitted to all of the corresponding call process layer software (3203-3).

Subsequently, the transmission status is notified to the status managing unit (3204-3). Then, step 3009-2 may be conducted.

Figure 11:
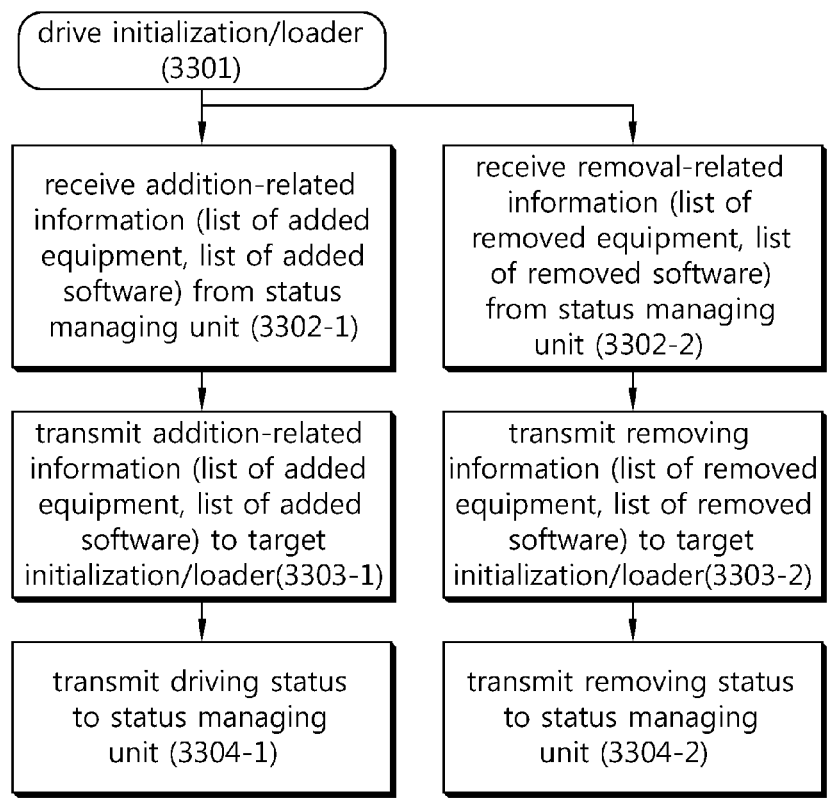

FIG. 11 illustrates an example of an operation of an initialization/loader of a cloud virtual base station management system according to the present invention.

Referring to FIG. 11, the initialization/loader is driven (3301).

By way of example, in step 3301, addition-related information (e.g., list of added equipment, list of added software) is received from the status managing unit (3302-1).

Subsequently, the addition-related information (e.g., list of added equipment, list of added software) is transmitted to the target initialization/loader (3303-1).

Subsequently, the driving status is transmitted to the status managing unit (3304-1). Then, step 3014-1 may be conducted.

As another example, in step 3301, removal-related information (e.g., list of removed equipment, list of removed software) is received from the status managing unit (3302-2).

Subsequently, the removal-related information (e.g., list of removed equipment, list of removed software) is transmitted to the target initialization/loader (3303-2).

Then, the removing status is transmitted to the status managing unit (3304-2). Thereafter, step 3014-2 may be carried out.

Figure 12:
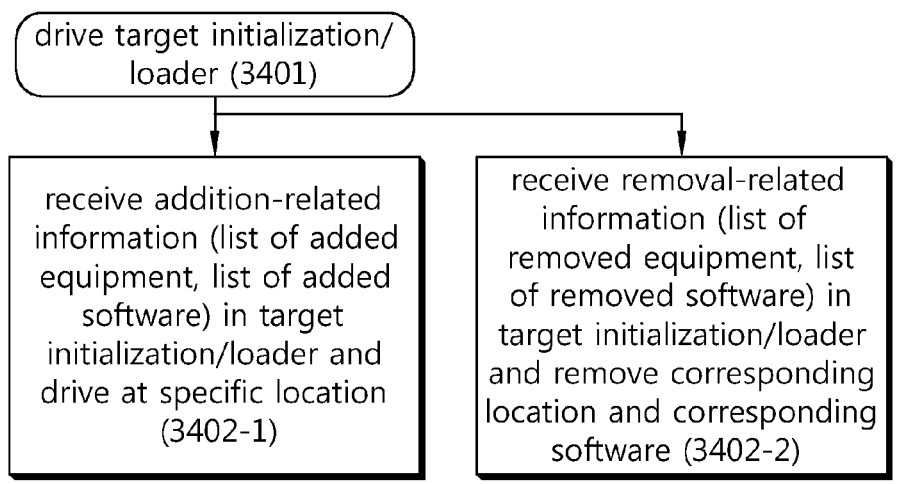

FIG. 12 illustrates an example of an operation of a target initialization/loader of a cloud virtual base station management system according to the present invention.

Referring to FIG. 12, the target initialization/loader is driven (3401).

As an example, subsequent to step 3401, addition-related information (e.g., list of added equipment, list of added software) is received and the added software is driven in a specific location (3402-1). Subsequently, step 3303-1 may be conducted.

As another example, subsequent to step 3401, removal-related information (e.g., list of removed equipment, list of removed software) is received and a corresponding software of a corresponding location are removed (3402-2). Subsequently, step 3303-2 may be performed.

It will be understood by those skilled in the art that various changes may be made to the present invention without departing from the scope of the present invention, and accordingly, the present invention is not limited to the above-described embodiments and the accompanying drawings.

In the above-exemplified systems, although the methods are described based on the flowcharts having a series of steps or blocks, the present invention is not limited to the order of the steps. Rather, some steps may be performed concurrently with or in a different order from other steps. Further, it will be understood by those skilled in the art that other steps may be included in the flowcharts or some of the steps of the flowcharts may be excluded without affecting the scope of the present invention.

What is claimed is:

1. A cloud virtual base station management system for managing a cloud virtual base station system, the system comprising:
    a processor configured to:
    configure, by an initialization and loader, a resource of the cloud virtual base station system to add or remove an execution file for a mobile communication service, wherein the cloud virtual base station manages one or more cells;
    monitor, by a target status managing unit, the cloud virtual base station system, a wireless resource, a status of the execution file, or a configuration status of the configured resource;
    notify a system managed by an operator of an error of the cloud virtual base station system, the wireless resource, the status of the execution file, or the configuration status of the configured resource;
    determine, by the target status managing unit, if a real-time measure is possible in the system managed by the operator if the error exists; and
    reconfigure, by the initialization and loader, the configured resource to add or remove the execution file if the real-time measure is possible; and
    a memory configured to store the execution file.

2. The system of claim 1, wherein the processor is further configured to activate or inactivate, by a configuration managing unit, a hardware shape for the cloud virtual base station system, block the hardware shape or release the blocking, add or remove the hardware shape, change a parameter, or manage configuration information of a list of software added or removed during an operation.

3. The system of claim 2, wherein the processor is further configured to manage, by a file managing unit, the execution file on a per-module basis in a specific mode that is added or removed initially or during an operation.

4. The system of claim 3, wherein the initialization and loader comprises:
    an operator processing module that performs an initialization operation using an operator or downloads a passive execution file that is added or removed initially or during an operation;
    an inter-internal module processing module that performs an interworking process between the configuration managing unit, the target status managing unit, and the file managing unit;
    a software download and execution processing module that downloads or executes an automatic or passive necessary execution file that is added or removed initially or during an operation in a physical location of the cloud virtual base station system while interworking with the cloud virtual base station system; and
    a status report processing module that manages a status reported from the cloud virtual base station system or manages an error of the cloud virtual base station system or a status of a wireless resource.

5. The system of claim 3, wherein the target status managing unit comprises:
    a status collecting module that collects a driven file, a status of hardware, a status of an error or a status of a wireless resource; a status processing module that performs a process when the status of the hardware, the status of the error, or the status of the wireless resource occurs; and
    a status information managing module that stores information related to the driven file, the status of the hardware, the status of the error, or the status of the wireless resource, wherein the status of the wireless resource includes a status of a configuration of the initial resource or the resource reconfigured during an operation.

6. The system of claim 5, wherein the status of the wireless resource includes information on a traffic distribution, a wireless channel or hardware load status, wherein the status processing module performs a process of restoring an error, adding or removing a resource.

7. The system of claim 3, wherein the configuration managing unit comprises:
    an operator processing module that activates or inactivates a hardware shape for the cloud virtual base station system through an operator, blocks the hardware or releases the blocking, adds or removes a hardware shape, change a parameter, or processes configuration information or operation information of a list of software that is added or removed during an operation;
    an inter-internal module processing module that performs an interworking process between the initialization and loader, the target status managing unit, or the file managing unit; and
    a configuration information managing module that manages the configuration information or the operation information.

8. A method of managing a cloud virtual base station system by a cloud virtual base station management system in a processor, the method comprising:
    a target initializing step that configures a resource of the cloud virtual base station system to add or remove an execution file for a mobile communication service, wherein the cloud virtual base station manages one or more cells;
    a status managing step that monitors the cloud virtual base station system, a wireless resource, a status of the execution file, or a configuration status of the configured resource;
    a configuration managing step that activates or inactivates a hardware shape for the cloud virtual base station system, blocks the hardware shape or releases the blocking, adds or removes the hardware shape, changes a parameter, or manages configuration information of a list of software added or removed during an operation;

a mode controlling step that controls the cloud virtual base station system in a predetermined specific mode;

an information managing step that manages hardware information, file information, or control information of each module of the cloud virtual base station system;

a file managing step that manages the execution file for each module of the cloud virtual base station system by adding or removing the predetermined specific mode initially or during an operation, wherein the execution file is stored in a memory;

notifying a system managed by an operator of an error of the cloud virtual base station system, the wireless resource, the status of the execution file, or the configuration status of the configured resource;

determining if a real-time measure is possible in the system managed by the operator if the error exists; and reconfiguring the configured resource to add or remove the execution file if the real-time measure is possible.

9. The method of claim 8, wherein the status managing step further comprises:

a step of collecting resource status information of a target including a traffic distribution, a status of a wireless channel, or a status of a hardware load; and determining whether a measured value or an average of accumulated measured values of the traffic distribution, the status of the wireless channel, or a degree of the hardware load is not more than a predetermined maximum threshold and not less than a predetermined minimum threshold.

10. The method of claim 9, wherein the status managing step includes configuring or reconfiguring a resource during an operation if the measured value or average of accumulated measured values of the traffic distribution, the status of the wireless channel, or a degree of the hardware load is more than the predetermined maximum threshold.

11. The method of claim 10, wherein the status managing step includes filtering and detecting a list of addition-related information for adding a hardware or software resource of the cloud virtual base station system which is in operation if the measured value or average of accumulated measured values of the traffic distribution, the status of the wireless channel, or a degree of the hardware load is more than the predetermined maximum threshold.

12. The method of claim 11, wherein the list of the addition-related information includes a list of added hardware or a list of software for each of the added hardware.

13. The method of claim 9, wherein the status managing step includes configuring or reconfiguring a resource during an operation if the measured value or average of accumulated measured values of the traffic distribution, the status of the wireless channel, or a degree of the hardware load is less than the predetermined minimum threshold.

14. The method of claim 13, wherein the status managing step includes filtering and detecting a list of removal-related information for removing a hardware or software resource of the cloud virtual base station system which is in operation if the measured value or average of accumulated measured values of the traffic distribution, the status of the wireless channel, or a degree of the hardware load is less than the predetermined minimum threshold.

15. The method of claim 14, wherein the list of the removal-related information includes a list of removed hardware or a list of software for each of the removed hardware.

* * * * *